(12) United States Patent
Ying

(10) Patent No.: US 12,185,422 B2
(45) Date of Patent: Dec. 31, 2024

(54) COMMUNICATION METHOD AND APPARATUS

(71) Applicant: HUAWEI TECHNOLOGIES CO., LTD., Guangdong (CN)

(72) Inventor: Jiangwei Ying, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 341 days.

(21) Appl. No.: 17/871,583

(22) Filed: Jul. 22, 2022

(65) Prior Publication Data

US 2022/0360969 A1 Nov. 10, 2022

Related U.S. Application Data

(63) Continuation of application No. PCT/CN2020/074030, filed on Jan. 23, 2020.

(51) Int. Cl.
*H04W 8/20* (2009.01)
*H04W 8/22* (2009.01)
(Continued)

(52) U.S. Cl.
CPC ............... *H04W 8/20* (2013.01); *H04W 8/22* (2013.01); *H04W 28/0268* (2013.01); *H04W 76/10* (2018.02)

(58) Field of Classification Search
CPC .................................. H04W 8/20; H04W 8/22
See application file for complete search history.

(56) References Cited

U.S. PATENT DOCUMENTS

2014/0120925 A1 5/2014 Kanthala et al.
2015/0282059 A1 10/2015 Nayak et al.
(Continued)

FOREIGN PATENT DOCUMENTS

CN 104125098 A 10/2014
CN 104581872 A 4/2015
(Continued)

OTHER PUBLICATIONS

PCT International Search Report and Written Opinion issued in International Application No. PCT/CN2020/074030 on Oct. 27, 2020, 16 pages (with English translation).
(Continued)

*Primary Examiner* — Zhiren Qin
(74) *Attorney, Agent, or Firm* — Fish & Richardson P.C.

(57) ABSTRACT

The disclosure provides example communication methods and apparatuses. One example method includes that a terminal device receives first transmission capability information of a first universal subscriber identity module (USIM) from a first access network device corresponding to the first USIM, where the first transmission capability information of the first USIM comprises single communication duration of the first USIM and a single communication periodicity of the first USIM, and the terminal device includes the first USIM and a second USIM. The first terminal device sends a first response message to the first access network device based on a transmission capability requirement of the first USIM and a service of the terminal device, where the first response message indicates that use of the first transmission capability information of the first USIM is either accepted or rejected, or the first response message comprises second transmission capability information of the first USIM.

20 Claims, 5 Drawing Sheets

(51) Int. Cl.
*H04W 28/02* (2009.01)
*H04W 76/10* (2018.01)

(56) References Cited

U.S. PATENT DOCUMENTS

| | | | |
|---|---|---|---|
| 2017/0230932 | A1 | 8/2017 | Challa et al. |
| 2022/0248209 | A1* | 8/2022 | Shaheen .................. H04W 8/24 |
| 2022/0272761 | A1* | 8/2022 | Park .................. H04W 74/0833 |
| 2022/0361133 | A1* | 11/2022 | Shaheen .................. H04W 8/20 |

FOREIGN PATENT DOCUMENTS

| | | |
|---|---|---|
| CN | 106535331 A | 3/2017 |
| CN | 108242991 A | 7/2018 |
| CN | 109195231 A | 1/2019 |
| CN | 109315017 A | 2/2019 |
| CN | 110337825 A | 10/2019 |
| CN | 110383870 A | 10/2019 |
| CN | 110574466 A | 12/2019 |

OTHER PUBLICATIONS

SA1 (from S1-190494), "New SID: Study on Support for Multi-USIM Devices (FS_MUSIM)," 3GPP TSG SA Meeting #83, SP-190091, Shenzhen, China, Mar. 20-22, 2019, 3 pages.
SA WG2, "Revised SID: Study on system enablers for multi-SIM devices," TSG SA Meeting #SP-83, SP-190248, Shenzhen, China, Mar. 20-22, 2019, 4 pages.
Vivo, "Report of phase 1 Multi-SIM email discussion," 3GPP TSG-RAN WG Meeting #85, RP-191898, Newport Beach, USA, Sep. 16-20, 2019, 36 pages.
Extended European Search Report in European Appln No. 20915997.9, dated Dec. 14, 2022, 11 pages.
Office Action in Chinese Appln. No. 202080094199.2, dated May 6, 2023, 7 pages.

* cited by examiner

COMMUNICATION METHOD AND APPARATUS

CROSS-REFERENCE TO RELATED APPLICATIONS

This application is a continuation of International Application No. PCT/CN2020/074030, filed on Jan. 23, 2020. The aforementioned patent applications are hereby incorporated by reference in their entirety

TECHNICAL FIELD

Embodiments of this application relate to the field of communication technologies, and in particular, to a communication method and an apparatus.

BACKGROUND

Currently, a terminal device in the market supports two universal subscriber identity module (Universal Subscriber Identity Module, USIM) cards, which are respectively referred to as a first USIM and a second USIM.

In a current technology, when two USIM cards are in use, only one USIM card can exclusively occupy resources, and the other USIM card does not occupy any resource. Alternatively, when one USIM card is in use, the other USIM card stops working.

In the foregoing solution, because a specific USIM card stops working, a service may not be performed, resulting in low service efficiency and poor user experience.

SUMMARY

Embodiments of this application provide a communication method and an apparatus, to resolve a problem that a service may not be performed because a USIM card stops working, resulting in low service efficiency and poor user experience.

According to a first aspect, an embodiment of this application provides a communication method, including: When a first service needs to be newly established on a first USIM, a terminal device obtains transmission capability information. The transmission capability information includes single communication duration of the first USIM and single communication duration of a second USIM. The terminal device includes the first USIM and the second USIM. The single communication duration of the second USIM is a single communication periodicity of the first USIM, and the single communication duration of the first USIM is a single communication periodicity of the second USIM. The terminal device determines, based on the transmission capability information and a requirement of the first service, whether to establish a first service. The requirement of the first service indicates a delay requirement of the first service.

Based on the foregoing solution, when a new service arrives, a solution of determining, based on the transmission capability information of the first USIM and the second USIM, whether to establish the new service is provided. Further, when the new service is established, it can be ensured that services of a plurality of USIM cards in the terminal device are simultaneously performed, so that a problem in the background that user experience is poor because a USIM exclusively occupies resources, and another USIM cannot be met to perform a service is resolved.

In a possible implementation method, that the terminal device determines, based on the transmission capability information and a requirement of the first service, whether to establish a first service includes: If the single communication duration of the second USIM in the transmission capability information is less than the delay requirement of the first service, the terminal device establishes the first service. Alternatively, if the single communication duration of the second USIM in the transmission capability information is greater than the delay requirement of the first service, the terminal device adjusts the single communication duration of the second USIM, to enable adjusted transmission capability information to meet the delay requirement of the first service and a delay requirement of a second service, where a priority of the second service is higher than a priority of the first service. Alternatively, if the single communication duration of the second USIM in the transmission capability information is greater than the delay requirement of the first service, the terminal device determines not to establish the first service. Alternatively, if the single communication duration of the second USIM in the transmission capability information is greater than the delay requirement of the first service, and when the first service is a service with a highest priority in the terminal, the terminal device determines to establish the first service.

In a possible implementation method, that the terminal device adjusts the single communication duration of the second USIM includes: The terminal device reduces the single communication duration of the second USIM.

In a possible implementation method, after the terminal device adjusts the single communication duration of the second USIM, the terminal device sends adjusted single communication duration of the second USIM to the first access network device corresponding to the first USIM. The terminal device receives a response message from the first access network device, where the response message indicates that use of the adjusted single communication duration of the second USIM is accepted.

In a possible implementation method, that if the single communication duration of the second USIM in the transmission capability information is greater than the delay requirement of the first service, the terminal device adjusts the single communication duration of the second USIM, to enable adjusted transmission capability information to meet the delay requirement of the first service and a delay requirement of the second service includes: If the single communication duration of the second USIM in the transmission capability information is greater than the delay requirement of the first service, the terminal device adjusts the single communication duration of the first USIM and the single communication duration of the second USIM, to enable the adjusted transmission capability information to meet the delay requirement of the first service and the delay requirement of the second service.

In a possible implementation method, if to establish the first service is determined, the terminal device determines a third service that needs to be stopped, where a priority of the third service is lower than the priority of the first service. The terminal device determines, based on the third service, a protocol data unit PDU session that needs to be released or deactivated and/or a quality of service QoS flow that needs to be deleted or deactivated.

According to a second aspect, an embodiment of this application provides a communication method, including: A terminal device receives first transmission capability information of a first USIM from a first access network device corresponding to the first universal subscriber identity module USIM, where the first transmission capability information includes single communication duration and a single communication periodicity of the first USIM, and the terminal device includes the first USIM and a second USIM. The single communication periodicity of the first USIM is single communication duration of the second USIM. The terminal device sends a first response message to the first access network device based on a transmission capability requirement of the first USIM and a service of the terminal device. The first response message indicates that use of the first transmission capability information is accepted, or the first response message indicates that use of the first transmission capability information is rejected, or the response message includes second transmission capability information of the first USIM.

Based on the foregoing solution, the first USIM and the second USIM may simultaneously perform services based on their respective transmission capability information, to resolve a problem in the background that user experience is poor because a USIM exclusively occupies resources, and another USIM cannot perform a service. In addition, a solution in which the terminal device negotiates transmission capability information with an access network device is further provided.

In a possible implementation method, before the terminal device receives the first transmission capability information of the first USIM from the first access network device corresponding to the first USIM, the terminal device initiates protocol data unit PDU session establishment or quality of service QoS flow establishment for the first service of the first USIM. Alternatively, the terminal device initiates PDU session activation or QoS flow activation for the first service of the first USIM.

In a possible implementation method, that the terminal device sends a first response message to the first access network device based on a transmission capability requirement of the first USIM and a service of the terminal device includes: When the first transmission capability information of the first USIM is used, if the first service and a second service of the terminal device can be simultaneously performed, and a priority of the second service is higher than a priority of the first service, the response message indicates that use of the first transmission capability information is accepted. Alternatively, when the first transmission capability information of the first USIM is used, if the first service and a second service of the terminal device cannot be simultaneously performed, and a priority of the first service is higher than a priority of the second service, the response message indicates that use of the first transmission capability information is accepted. Alternatively, when the first transmission capability information of the first USIM is used, if the first service and the second service of the terminal device cannot be simultaneously performed, and a priority of the first service is lower than a priority of the second service, the response message indicates that use of the first transmission capability information is rejected, or the response message includes the second transmission capability information of the first USIM.

In a possible implementation method, the terminal device sends, based on the transmission capability information of the first USIM and a service of the terminal device, transmission capability information of the second USIM to a second access network device corresponding to the second USIM. The transmission capability information of the second USIM includes a single communication periodicity of the second USIM and the single communication duration of the second USIM, where the single communication periodicity of the second USIM is the single communication duration of the first USIM, and the single communication duration of the second USIM is the single communication periodicity of the first USIM.

In a possible implementation method, the first response message includes the second transmission capability information of the first USIM. The terminal device receives a second response message from the first access network device. If the second response message indicates that use of the second transmission capability information is accepted, the terminal device determines that the first USIM uses the second transmission capability information to perform communication. Alternatively, if the second response message indicates that use of the second transmission capability information is rejected, the terminal device determines that the first USIM uses the first transmission capability information to perform communication.

According to a third aspect, an embodiment of this application provides a communication method, including: A first access network device corresponding to a first universal subscriber identity module USIM sends first transmission capability information of the first USIM to a terminal device, where the first transmission capability information includes single communication duration and a single communication periodicity of the first USIM, and the terminal device includes the first USIM and a second USIM. The single communication periodicity of the first USIM is single communication duration of the second USIM. The first access network device receives a first response message from the terminal device, where the first response message indicates that use of the first transmission capability information is accepted, or the first response message indicates that use of the first transmission capability information is rejected, or the first response message includes second transmission capability information of the first USIM.

Based on the foregoing solution, the first USIM and the second USIM may simultaneously perform services based on their respective transmission capability information, to resolve a problem in the background that user experience is poor because a USIM exclusively occupies resources, and another USIM cannot perform a service. In addition, a solution in which the terminal device negotiates transmission capability information with an access network device is further provided.

In a possible implementation method, before the first access network device corresponding to the first USIM sends the first transmission capability information of the first USIM to the terminal device, the first access network device receives a first request, where the first request initiates establishment of a protocol data unit PDU session or establishment of a quality of service QoS flow for a first service. Alternatively, the first request is used to initiate PDU session activation or QoS flow activation for a first service.

In a possible implementation method, that the first access network device receives a first response message from the terminal device includes: When the first transmission capability information of the first USIM is used, if the first service and a second service of the terminal device can be simultaneously performed, and a priority of the second service is higher than a priority of the first service, the first response message indicates that use of the first transmission capability information is accepted. Alternatively, when the first transmission capability information of the first USIM is used, if the first service and a second service of the terminal device cannot be simultaneously performed, and a priority of the first service is higher than a priority of the second service, the first response message indicates that use of the first transmission capability information is accepted. Alternatively, when the first transmission capability information of the first USIM is used, if the first service and the second service of the terminal device cannot be simultaneously performed, and a priority of the first service is lower than a priority of the second service, the first response message indicates that use of the first transmission capability information is rejected, or the first response message includes the second transmission capability information of the first USIM.

In a possible implementation method, the first access network device determines, based on the transmission capability information of the first USIM, a protocol data unit PDU session that needs to be released or deactivated and/or a quality of service QoS flow that needs to be deleted or deactivated.

In a possible implementation method, the first access network device sends indication information to a first session management network element corresponding to the first USIM, where the indication information indicates that the first request cannot be met, and a cause value indicating that the first request cannot be met is multi-USIM communication. Alternatively, the indication information indicates the first access network device to reject the first request.

In a possible implementation method, the first response message includes the second transmission capability information of the first USIM. The first access network device sends a second response message to the terminal device, where the second response message indicates that use of the second transmission capability information is accepted. Alternatively, the second response message indicates that use of the second transmission capability information is rejected.

In a possible implementation method, the first response message indicates that use of the first transmission capability information is rejected. Alternatively, the first access network device sends a second response message to the terminal device, where the second response message indicates that use of the second transmission capability information is rejected. The first access network device rejects establishment of a PDU session or a QoS flow for the first service, and/or rejects activation of a PDU session or a QoS flow for the first service.

According to a fourth aspect, an embodiment of this application provides a communication method, including: A second access network device corresponding to a second universal subscriber identity module USIM receives transmission capability information of the second USIM from a terminal device, where the terminal device includes a first USIM and the second USIM, and the transmission capability information of the second USIM includes a single communication periodicity of the second USIM and single communication duration of the second USIM. The single communication periodicity of the second USIM is single communication duration of the first USIM, and the single communication duration of the second USIM is a single communication periodicity of the first USIM. The second access network device determines, based on the transmission capability information of the second USIM, a protocol data unit PDU session that needs to be released or deactivated and/or a quality of service QoS flow that needs to be deleted or deactivated.

In a possible implementation method, that the second access network device determines, based on the transmission capability information of the second USIM, a protocol data unit PDU session that needs to be released or deactivated and/or a quality of service QoS flow that needs to be deleted or deactivated includes: If a delay requirement of a PDU session in the second USIM cannot be met by transmission capability information of the second USIM, the second access network device determines that the PDU session is a PDU session that needs to be released or deactivated; and/or if a delay requirement of a QoS flow in the second USIM cannot be met by the transmission capability information of the second USIM, the second access network device determines that the QoS flow is a QoS flow that needs to be deleted or deactivated.

In a possible implementation method, the second access network device sends notification information to a second session management network element corresponding to the second USIM. The notification information is used to notify that a requirement of the PDU session that needs to be released in the second USIM, and/or a requirement of the PDU session that needs to be deactivated, and/or a requirement of the QoS flow that needs to be deleted, and/or a requirement of the QoS flow that needs to be deactivated cannot be met, and a cause value indicating that the requirement cannot be met is multi-USIM communication. Alternatively, the second access network device sends a request message to a second session management network element corresponding to the second USIM. The request message is used to request to release the PDU session that needs to be released, and/or request to deactivate the PDU session that needs to be deactivated, and/or delete the QoS flow that needs to be deleted, and/or deactivate the QoS flow that needs to be deactivated.

According to a fifth aspect, this application provides a communication apparatus. The apparatus may be a terminal device, or may be a chip used for the terminal device. The apparatus has a function of implementing the first aspect, the second aspect, the embodiments of the first aspect, or the embodiments of the second aspect. The function may be implemented by hardware, or may be implemented by hardware executing corresponding software. The hardware or the software includes one or more modules corresponding to the function.

According to a sixth aspect, this application provides a communication apparatus. The apparatus may be an access network device, or may be a chip used in a first access network device. The apparatus has a function of implementing the third aspect, the fourth aspect, the embodiments of the third aspect, or the embodiments of the fourth aspect. The function may be implemented by hardware, or may be implemented by hardware executing corresponding software. The hardware or the software includes one or more modules corresponding to the function.

According to a seventh aspect, this application provides a communication apparatus, including a processor and a memory. The memory is configured to store computer-executable instructions. When the apparatus runs, the processor executes the computer-executable instructions stored in the memory, so that the apparatus performs the methods according to the first aspect to the fourth aspect or the embodiments of the first aspect to the fourth aspect.

According to an eighth aspect, this application provides a communication apparatus. The apparatus includes units or means (means) configured to perform the steps in the first aspect to the fourth aspect or the embodiments of the first aspect to the fourth aspect.

According to a ninth aspect, this application provides a communication apparatus, including a processor and an interface circuit. The processor is configured to: communicate with another apparatus through the interface circuit, and perform the methods according to the first aspect to the fourth aspect or the embodiments of the first aspect to the fourth aspect. There are one or more processors.

According to a tenth aspect, this application provides a communication apparatus, including a processor, configured to be connected to a memory, and configured to invoke a program stored in the memory, to perform the methods according to the first aspect to the fourth aspect or the embodiments of the first aspect to the fourth aspect. The memory may be located inside or outside the apparatus. In addition, there are one or more processors.

According to an eleventh aspect, this application further provides a computer-readable storage medium. The computer-readable storage medium stores instructions. When the instructions are run on a computer, a processor is enabled to perform the methods according to the first aspect to the fourth aspect or the embodiments of the first aspect to the fourth aspect.

According to a twelfth aspect, this application further provides a computer program product, including a computer program. When the computer program is invoked by a processor, the method according to the first aspect to the fourth aspect or the embodiments of the first aspect to the fourth aspect is performed.

According to a thirteenth aspect, this application further provides a chip system. The chip system includes a processor, configured to perform the methods according to the first aspect to the fourth aspect or the embodiments of the first aspect to the fourth aspect.

DESCRIPTION OF EMBODIMENTS

To make objectives, technical solutions, and advantages of embodiments of this application clearer, the following further describes embodiments of this application in detail with reference to accompanying drawings. A specific operation method in a method embodiment may also be applied to an apparatus embodiment or a system embodiment. In descriptions of embodiments of this application, "a plurality of" means two or more than two unless otherwise specified.

Figure 1A:
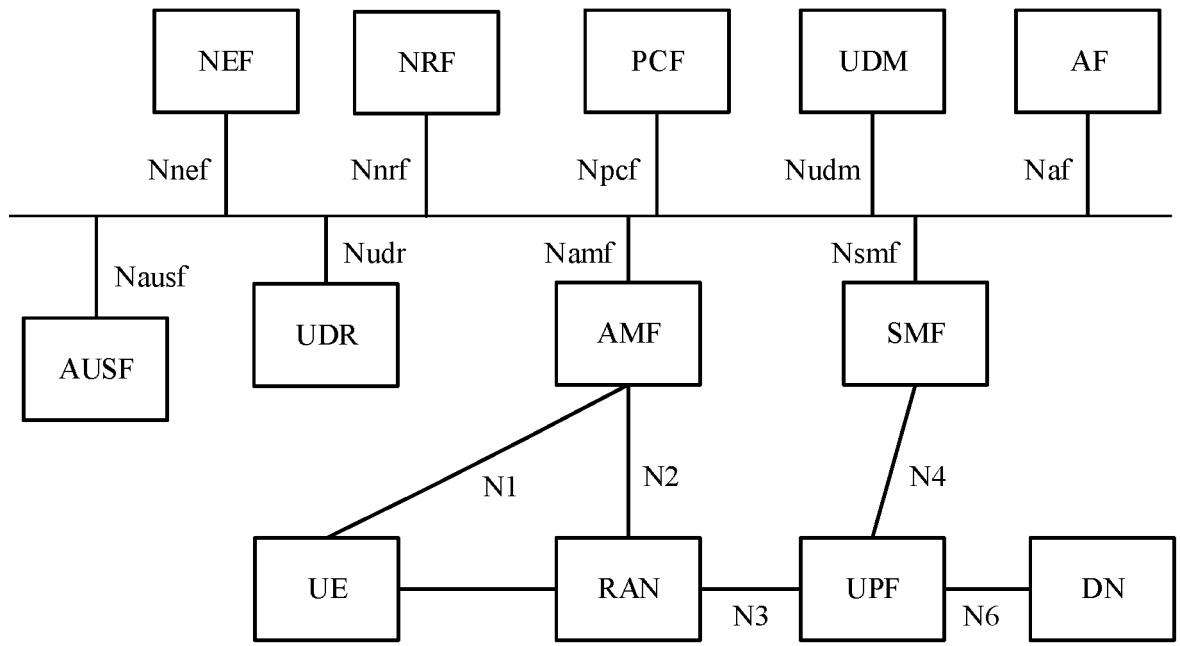
FIG. 1A is a schematic diagram of a 5G network architecture based on a service-oriented architecture.

FIG. 1A is a schematic diagram of a 5th generation (5th generation, 5G) network architecture based on a service-oriented architecture. The 5G network architecture shown in FIG. 1A may include three parts: a terminal device, a data network (data network, DN), and a carrier network. The following briefly describes functions of some network elements.

The carrier network may include one or more of the following network elements: an authentication server function (Authentication Server Function, AUSF) network element, a network exposure function (network exposure function, NEF) network element, a policy control function (policy control function, PCF) network element, a unified data management (unified data management, UDM) network element, a unified data repository (Unified Data Repository, UDR) network element, a network repository function (Network Repository Function, NRF) network element, an application function (application function, AF) network element, an access and mobility management function (access and mobility management function, AMF) network element, a session management function (session management function, SMF) network element, a radio access network (radioaccess network, RAN), a user plane function (user plane function, UPF) network element, and the like. In the foregoing carrier network, parts other than the radio access network may be referred to as core network parts.

The terminal device (terminal device) is a device having a wireless transceiver function. The terminal device may be deployed on land, and includes an indoor device, an outdoor device, a handheld device, or a vehicle-mounted device; or may be deployed on a water surface (for example, on a ship); or may be deployed in the air (for example, on an airplane, a balloon, or a satellite). The terminal device may be a mobile phone (mobile phone), a tablet (pad), a computer having a wireless transceiver function, a virtual reality (virtual reality, VR) terminal, an augmented reality (augmented reality, AR) terminal, a wireless terminal in industrial control (industrial control), a wireless terminal in self-driving (self-driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), user equipment (user equipment, UE), or the like.

The terminal device may establish a connection with the carrier network through an interface (for example, N1) provided by the carrier network, and use services such as a data service and/or a voice service provided by the carrier network. The terminal device may further access the DN through the carrier network, and use a carrier service deployed on the DN and/or a service provided by a third party. The third party may be a service provider other than the carrier network and the terminal device, and may provide services such as a data service and/or a voice service for the terminal device. A specific representation form of the third party may be specifically determined based on an actual application scenario, and is not limited herein.

The RAN is a sub-network of the carrier network, and is an implementation system between a service node in the carrier network and the terminal device. To access the carrier network, the terminal device first passes through the RAN, and may be connected to the service node in the carrier network through the RAN. A RAN device is a device that provides a wireless communication function for the terminal device, and the RAN device is also referred to as an access network device. The RAN device includes but is not limited to: a next generation NodeB (g nodeB, gNB), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseBand unit, BBU), a transmission reception point (transmitting and receiving point, TRP), a transmission point (transmitting point, TP), a mobile switching center, and the like in 5G.

The AMF network element mainly performs functions such as mobility management, and access authentication/authorization. In addition, the AMF network element is further responsible for transferring a user policy between UE and a PCF.

The SMF network element mainly performs functions such as session management, execution of a control policy delivered by a PCF, UPF selection, and UE internet protocol (internet protocol, IP) address assignment.

The UPF network element serves as an interface UPF of the data network, and implements functions such as user plane data forwarding, session/flow-based charging statistics, and bandwidth throttling.

The UDM network element is mainly responsible for functions such as subscription data management and user access authorization.

The UDR is mainly responsible for a function of accessing data of types such as subscription data, policy data, and application data.

The NEF network element is mainly configured to support capability and event exposure.

The AF network element mainly transfers a requirement of an application side on a network side, for example, a quality of service (Quality of Service, QoS) requirement or user status event subscription. The AF may be a third-party functional entity, or may be an application service deployed by a carrier, for example, an IP multimedia subsystem (IP Multimedia Subsystem, IMS) voice call service.

The PCF network element is mainly responsible for policy control functions such as session-level or service flow-level charging, QoS bandwidth guarantee and mobility management, and UE policy decision. In this architecture, PCFs connected to the AMF and the SMF are separately an AM PCF (PCF for Access and Mobility Control) and an SM PCF (PCF for Session Management). In an actual deployment scenario, the PCFs may not be a same PCF entity.

The NRF network element may be configured to provide a network element discovery function and provide, based on a request from another network element, network element information corresponding to a network element type. The NRF further provides a network element management service, for example, registration, update, and deregistration of a network element and subscription and push of a network element status.

The AUSF network element is mainly responsible for user authentication, to determine whether to allow a user or a device to access a network.

The DN is a network outside the carrier network. The carrier network may access a plurality of DNs. A plurality of services may be deployed on the DN, and the DN may provide services such as a data service and/or a voice service for the terminal device. For example, the DN is a private network of a smart factory, a sensor installed in a workshop of the smart factory may be a terminal device, a control server of the sensor is deployed in the DN, and the control server may provide a service for the sensor. The sensor may communicate with the control server, to obtain instructions of the control server, transmit collected sensor data to the control server based on the instructions, and the like. For another example, the DN is an internal office network of a company, a mobile phone or a computer of an employee of the company may be a terminal device, and the mobile phone or the computer of the employee may access information, data resources, and the like on the internal office network of the company.

In FIG. 1A, Nausf, Nnef, Npcf, Nudm, Naf, Namf, Nsmf, N1, N2, N3, N4, and N6 are interface serial numbers. For meanings of these interface serial numbers, refer to definitions in a 3GPP standard protocol. This is not limited herein.

Figure 1B:
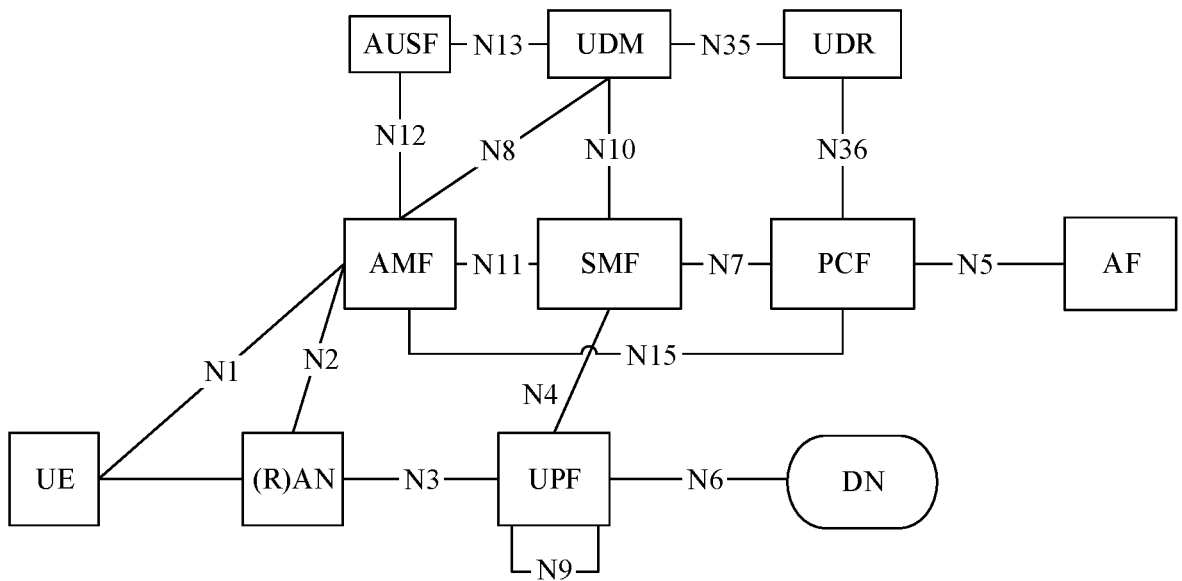
FIG. 1B is a schematic diagram of a 5G network architecture based on a point-to-point interface.

FIG. 1B is a schematic diagram of a 5G network architecture based on a point-to-point interface. For descriptions of functions of network elements in FIG. 1B, refer to descriptions of functions of corresponding network elements in FIG. 1A. Details are not described again. A main difference between FIG. 1B and FIG. 1A lies in that interfaces between network elements in FIG. 1B are point-to-point interfaces rather than service-oriented interfaces.

In the architecture shown in FIG. 1B, names and functions of the interfaces between the network elements are as follows:

(1) N7 represents an interface between the PCF and the SMF, and may be configured to deliver a protocol data unit (protocol data unit, PDU) session granularity control policy and a service data flow granularity control policy.

(2) N15 represents an interface between the PCF and the AMF, and may be configured to deliver a UE policy and an access control related policy.

(3) N5 represents an interface between the AF and the PCF, and may be configured to deliver an application service request and report a network event.

(4) N4 represents an interface between the SMF and the UPF, and may be configured to transfer information between a control plane and a user plane, including delivery of forwarding rules, QoS control rules, traffic statistics rules, and the like from the control plane to the user plane, and reporting of user plane information.

(5) N11 represents an interface between the SMF and the AMF, and may be configured to: transfer PDU session tunnel information between the RAN and the UPF, transfer a control message to be sent to the UE, transfer radio resource control information to be sent to the RAN, and the like.

(6) N2 represents an interface between the AMF and the RAN, and may be configured to transfer radio bearer control information and the like from a core network side to the RAN.

(7) N1 represents an interface between the AMF and the UE, and may be configured to transfer the QoS control rules and the like to the UE.

(8) N8 represents an interface between the AMF and the UDM, and may be used by the AMF to obtain, from the UDM, subscription data and authentication data related to access and mobility management, and used by the AMF to register current mobility management related information of the UE with the UDM.

(9) N10 represents an interface between the SMF and the UDM, and may be used by the SMF to obtain, from the UDM, subscription data related to session management, and used by the SMF to register current session related information of the UE with the UDM.

(10) N35 represents an interface between the UDM and the UDR, and may be used by the UDM to obtain user subscription data information from the UDR.

(11) N36 represents an interface between the PCF and the UDR, and may be used by the PCF to obtain policy related subscription data and application data related information from the UDR.

(12) N12 represents an interface between the AMF and the AUSF, and may be used by the AMF to initiate an authentication procedure to the AUSF, where an SUCI may be carried as a subscription identifier.

(13) N13 represents an interface between the UDM and the AUSF, and may be used by the AUSF to obtain a user authentication vector from the UDM, to perform an authentication procedure.

It may be understood that the network elements or the functions may be network elements in a hardware device, software functions running on dedicated hardware, or virtualized functions instantiated on a platform (for example, a cloud platform). Optionally, the foregoing network elements or the functions may be implemented by one device, may be jointly implemented by a plurality of devices, or may be one function module in one device. This is not specifically limited in embodiments of this application.

The mobility management network element, the session management network element, and the access network device in embodiments of this application may be respectively the AMF network element, the SMF network element, and the RAN device in FIG. 1A or FIG. 1B, or may be network elements that have functions of the AMF network element, the SMF network element, and the RAN device in a future communication network, for example, a 6th generation (6th generation, 6G) network. This is not limited in embodiments of this application.

To resolve the problem in the background, based on the network architecture shown in FIG. 1A or FIG. 1B, embodiments of this application provide two different methods.

In the following embodiments corresponding to FIG. 2 and FIG. 3, a terminal device has a capability of supporting a plurality of USIMs. For example, a first USIM and a second USIM exist on the terminal device. The first USIM corresponds to a first access network device, a first mobility management network element, and a first session management network element. The second USIM corresponds to a second access network device, a second mobility management network element, and a second session management network element. The first USIM and the second USIM may belong to a same public land mobile network (Public Land Mobile Network, PLMN), or may belong to different PLMNs. In addition, corresponding PDU sessions may be established in respective PLMNs.

Figure 2:
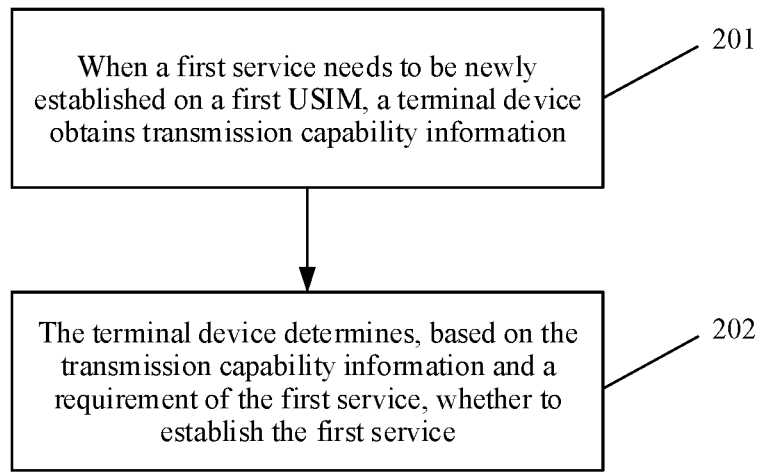
FIG. 2 is a schematic flowchart of a communication method according to an embodiment of this application.
Figure 3:
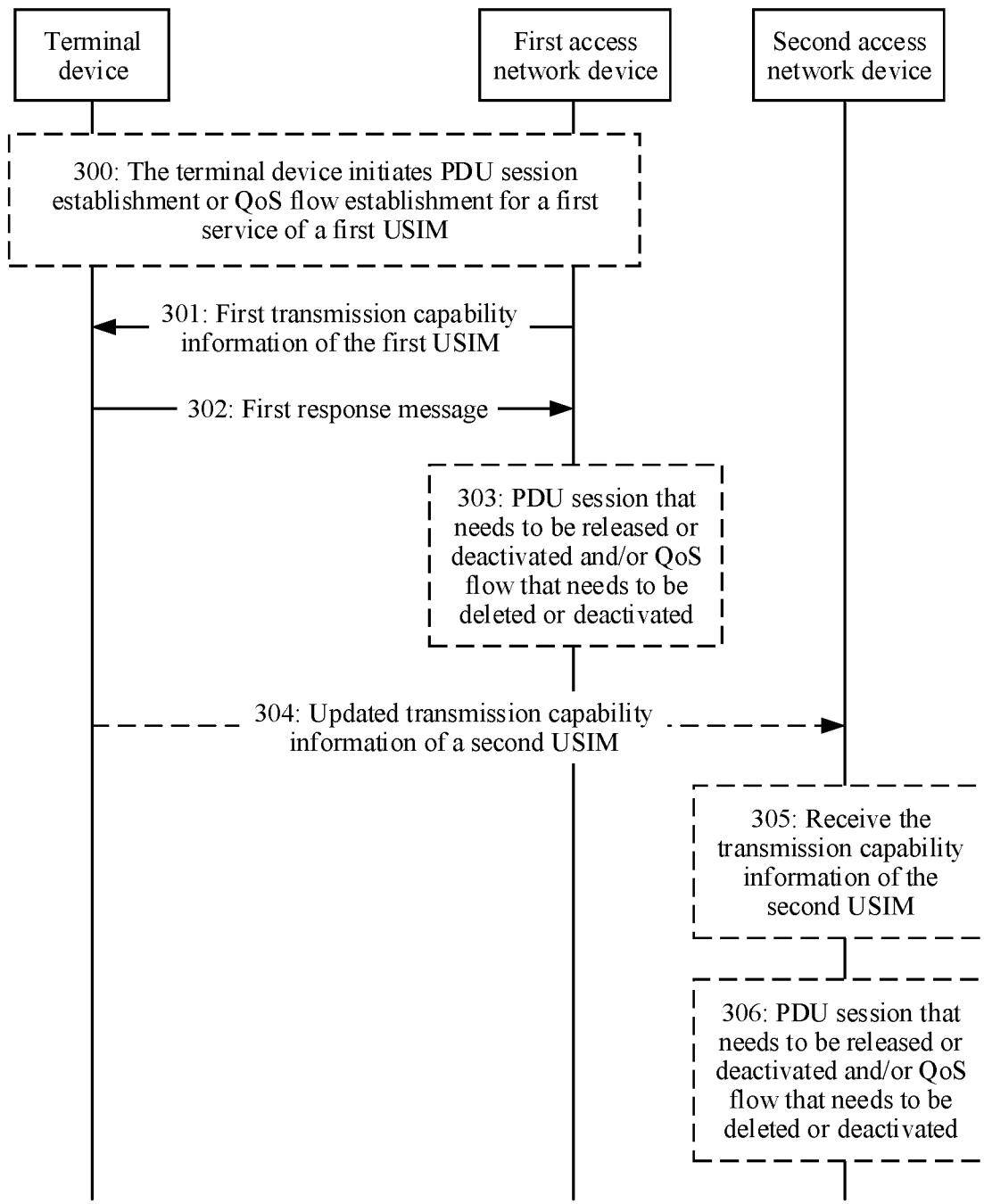
FIG. 3 is a schematic flowchart of another communication method according to an embodiment of this application.

The following embodiments corresponding to FIG. 2 and FIG. 3 may be applied to the following two scenarios:

Scenario 1: The first USIM is in an idle (idle) mode, the second USIM is in a connected (Connected) mode and has established a PDU session, and then the first USIM is switched to the connected mode and initiates PDU session establishment.

Scenario 2: Both the first USIM and the second USIM are in a connected mode and have established PDU sessions, and then either (for example, the first USIM) of the USIMs initiates establishment of a new PDU session, initiates establishment of a QoS flow on an established PDU session, initiates activation of a PDU session, or initiates activation of a QoS flow.

Alternatively, that the USIM is in a connected (connected) mode may also be referred to as that the USIM is in an active (active) mode, and that the USIM is in an idle (idle) mode may also be referred to as that the USIM is in an inactive (inactive) mode.

The connected mode means that a signaling connection has established between UE and a PLMN corresponding to the USIM, and the idle mode means that no signaling connection is established between the UE and the PLMN corresponding to the USIM.

In any one of the foregoing scenarios, transmission capability information corresponding to a USIM on the terminal device may change. Transmission capability information corresponding to one USIM indicates a status of communication time occupation by the USIM. The transmission capability information may be represented by using single communication duration and a single communication periodicity of the USIM, or may be represented by using a percentage of single communication duration of the USIM.

The transmission capability information of one USIM includes the single communication duration and the single communication periodicity. The transmission capability information of the first USIM includes the single communication duration and the single communication periodicity of the first USIM, and the transmission capability information of the second USIM includes single communication duration and a single communication periodicity of the second USIM. The single communication duration of the first USIM is equal to the single communication periodicity of the second USIM, and the single communication periodicity of the first USIM is equal to the single communication duration of the second USIM. For example, if the single communication periodicity of the first USIM is 30 milliseconds (ms), and the single communication duration is 60 ms, the single communication periodicity of the second USIM is 60 ms, and the single communication duration is 30 ms. The single communication periodicity indicates a time interval for performing a service by using one USIM, and the single communication duration indicates duration for performing a service by using one USIM. Herein, 30 ms and 60 ms are merely examples for description, and the single communication duration and the single communication periodicity may be any values.

The "single communication duration" may alternatively be understood as "duration of occupying a transmitter and/or a receiver for a single time", or "duration of occupying a sending link and/or a receiving link for a single time", or "duration of occupying a sending circuit and/or a receiving circuit for a single time", or "duration of occupying a transmit antenna and/or a receive antenna for a single time", or "duration of occupying a transmit module and/or a receive module for a single time". The "single communication periodicity" may alternatively be understood as "a periodicity of occupying a transmitter and/or a receiver for a single time", or "a periodicity of occupying a sending link and/or a receiving link for a single time", or "a periodicity of occupying a sending circuit and/or a receiving circuit for a single time", or "a periodicity of occupying a transmit antenna and/or a receive antenna for a single time", or "a periodicity of occupying a transmit module and/or a receive module for a single time".

As shown in FIG. 2, an embodiment of this application provides a schematic flowchart of a communication method. The method includes the following steps.

Step 201: When a first service needs to be newly established on a first USIM, a terminal device obtains transmission capability information. The transmission capability information includes transmission capability information of the first USIM and transmission capability information of a second USIM.

Step 202: The terminal device determines, based on the transmission capability information and a requirement of the first service, whether to establish the first service. The requirement of the first service indicates a delay requirement of the first service. Optionally, the requirement of the first service may further indicate another requirement of the first service, for example, a transmission rate or a packet loss rate.

For example, if the delay requirement of the first service is 100 ms, a single communication periodicity of the first USIM is 30 ms, and single communication duration is 50 ms, that is, a single communication periodicity of the second USIM is 50 ms, and single communication duration is 30 ms, the first USIM meets the delay requirement of the first service, the first service requires that the first USIM need to be used to transmit data every 100 ms at most, and the single communication periodicity of the first USIM is 30 ms, which is less than 100 ms. Therefore, the first USIM meets the delay requirement of the first service. To be specific, when the single communication periodicity of the first USIM (or the single communication duration of the second USIM) is less than or equal to the delay requirement of the first service, the first USIM meets the delay requirement of the first service.

Based on the foregoing solution, when a new service arrives, a solution of determining, based on the transmission capability information of the first USIM and the second USIM, whether to establish the new service is provided. Further, when the new service is established, it can be ensured that services of a plurality of USIM cards in the terminal device are simultaneously performed, so that a problem in the background that user experience is poor because a USIM exclusively occupies resources, and another USIM cannot be met to perform a service is resolved.

In an implementation method, the terminal device may determine, based on the following methods, whether to establish the first service.

In a first case, if the transmission capability information of the first USIM meets the delay requirement of the first service, that is, the single communication periodicity of the first USIM (namely, the single communication duration of the second USIM) in the transmission capability information of the first USIM is less than the delay requirement of the first service, the first service is established.

In a second case, if the transmission capability information of the first USIM does not meet the delay requirement of the first service, that is, the single communication periodicity of the first USIM (namely, the single communication duration of the second USIM) in the transmission capability information of the first USIM is greater than the delay requirement of the first service, the following implementation methods may be used.

Method 1: If the first service is a service with a highest priority in the terminal, the terminal device determines to establish the first service. In addition, the terminal device further needs to adjust the transmission capability information of the first USIM (for example, adjust the single communication periodicity of the first USIM, that is, adjust the single communication duration of the second USIM), to enable adjusted transmission capability information of the first USIM to meet the delay requirement of the first service.

In this case, because the transmission capability information of the first USIM is adjusted, a delay requirement of another service (referred to as a third service, and a priority of the third service is lower than that of the first service) on the first USIM or the second USIM may not be met. In this case, the terminal device may stop the service, for example, release or deactivate PDU sessions in which these services are located, and/or delete or deactivate QoS flows in which these services are located.

Method 2: The terminal device determines not to establish the first service.

Method 3: If the first service is not the service with the highest priority in the terminal, for example, a service whose priority is higher than that of the first service is referred to as a second service, the terminal device adjusts the single communication duration of the second USIM, to enable adjusted transmission capability information to meet the delay requirement of the first service and the delay requirement of the second service, to determine to establish the first service. Optionally, single communication duration of the first USIM is further adjusted.

To be specific, in the method, the transmission capability information is adjusted, so that the adjusted transmission capability information cannot affect the delay requirement of the second service, and can further meet the delay requirement of the first service.

Adjusting the single communication duration of the second USIM may be specifically reducing the single communication duration of the second USIM, or may be understood as reducing the single communication periodicity of the first USIM.

Adjusting the single communication duration of the first USIM may be specifically reducing the single communication duration of the first USIM, or may be understood as reducing the single communication periodicity of the second USIM.

After the terminal device adjusts the single communication duration of the second USIM, the terminal device may send adjusted single communication duration of the second USIM to the first access network device corresponding to the first USIM. Then the terminal device receives a response message from the first access network device, where the response message indicates that use of the adjusted single communication duration of the second USIM is accepted.

In this case, because the transmission capability information of the first USIM and the second USIM is adjusted, a delay requirement of another service (referred to as a third service, and a priority of the third service is lower than that of the first service) on the first USIM or the second USIM may not be met. In this case, the terminal device may stop the service, for example, release or deactivate PDU sessions in which these services are located, and/or delete or deactivate QoS flows in which these services are located.

As shown in FIG. 3, an embodiment of this application provides a schematic flowchart of another communication method. The method includes the following steps.

Step 301: A terminal device receives first transmission capability information of a first USIM from a first access network device corresponding to the first USIM.

For example, the first transmission capability information may be sent by using a radio resource control (Radio Resource Control, RRC) message.

Step 302: The terminal device sends a first response message to the first access network device based on a transmission capability requirement of the first USIM and a service of the terminal device. The first response message indicates that use of the first transmission capability information is accepted, or the first response message indicates that use of the first transmission capability information is rejected, or the first response message includes second transmission capability information of the first USIM. For example, the first response message may be sent by using the RRC message.

Based on the foregoing solution, the first USIM and the second USIM may simultaneously perform services based on their respective transmission capability information, to resolve a problem in the background that user experience is poor because a USIM exclusively occupies resources, and another USIM cannot perform a service. In addition, a solution in which the terminal device negotiates transmission capability information with an access network device is further provided.

Optionally, before step 301, the method further includes step 300: The terminal device initiates PDU session establishment or QoS flow establishment for the first service of the first USIM, or the terminal device initiates PDU session activation or QoS flow activation for the first service of the first USIM, to trigger the first access network device corresponding to the first USIM to negotiate the transmission capability information of the first USIM with the terminal device, so that the negotiated transmission capability information of the first USIM can meet the first service requirement as much as possible. The requirement of the first service indicates a delay requirement of the first service.

Optionally, the requirement of the first service may further indicate another requirement of the first service, for example, a transmission rate or a packet loss rate.

Content carried in the first response message in step 302 includes but is not limited to the following implementation methods.

Implementation method 1: When the first transmission capability information is used, if the first service of the first USIM and the second service of the terminal device can be simultaneously performed, the first response message indicates that use of the first transmission capability information is accepted.

To be specific, if the terminal device uses the first transmission capability information sent by the first access device, the delay requirement of the first service can be met on one hand, and the delay requirement of the second service can also be met on the other hand. The second service herein is a service whose priority is higher than that of the first service. The second service may be a service of the first USIM or the second USIM.

The first response message indicates that use of the first transmission capability information is accepted. For example, the first response message may carry indication information indicating that use of the first transmission capability information is accepted.

Implementation method 2: When the first transmission capability information is used, if the first service and the second service of the terminal device cannot be simultaneously performed, and a priority of the first service is higher than a priority of the second service, the first response message indicates that use of the first transmission capability information is accepted.

To be specific, if the terminal device uses the first transmission capability information sent by the first access device, the delay requirement of the first service can be met, but the delay requirement of the second service cannot be met. The second service herein is a service whose priority is lower than a priority of the first service. In this case, the terminal device preferentially meets the delay requirement of the first service. Therefore, use of the first transmission capability information is accepted. Therefore, the first transmission capability information is used as the negotiated transmission capability information of the first USIM, and the negotiated transmission capability information is notified to the first access network device. The second service may be a service of the first USIM or the second USIM.

The first response message indicates that use of the first transmission capability information is accepted. For example, the first response message may carry indication information indicating that use of the first transmission capability information is accepted.

Implementation method 3: When the first transmission capability information is used, if the first service and the second service of the terminal device cannot be simultaneously performed, and a priority of the first service is lower than a priority of the second service, the first response message indicates that use of the first transmission capability information is rejected, or the first response message includes the second transmission capability information of the first USIM.

To be specific, if the terminal device uses the first transmission capability information sent by the first access device, the delay requirement of the first service can be met, but the delay requirement of the second service cannot be met. The second service herein is a service whose priority is higher than that of the first service. In this case, the terminal device preferentially meets the delay requirement of the second service. Therefore, either the first service is rejected, or the transmission capability information (referred to as second transmission capability information) of the first USIM is re-determined, and the second transmission capability information meets both the delay requirement of the first service and the delay requirement of the second service. The second service may be a service of the first USIM or the second USIM.

The first response message indicates that use of the first transmission capability information is rejected. For example, the first response message may carry indication information indicating that use of the first transmission capability information is rejected.

In an implementation method, the first response message in step 302 includes the second transmission capability information of the first USIM, and after step 302, the terminal device may further receive the second response message from the first access network device corresponding to the first USIM. If the second response message indicates that use of the second transmission capability information is accepted, the terminal device determines that the first USIM uses the second transmission capability information to perform communication. Alternatively, if the second response message indicates that use of the second transmission capability information is rejected, the terminal device determines that the first USIM uses the first transmission capability information to perform communication.

In another implementation method, the first response message in step 302 indicates that use of the first transmission capability information is rejected. Alternatively, after receiving the second transmission capability information sent by the terminal device, the first access network device rejects use of the second transmission capability information. In this case, the first access network device sends a second response message to the terminal device, to indicate that use of the second transmission capability information is rejected. Based on the two cases, it indicates that the transmission capability information of the first USIM fails to be negotiated between the terminal device and the first access network device. In this case, when step 300 is performed, the following operation may be further performed: The first access network device rejects establishment of a PDU session or a QoS flow for the first service; and/or rejects activation of a PDU session or a QoS flow for the first service. Alternatively, it is understood as that a first request is rejected.

In an implementation method, after the foregoing step 302, after the terminal device negotiates the transmission capability information of the first USIM with the first access network device, new transmission capability information used by the terminal device is the first transmission capability information or the second transmission capability information. In this case, the transmission capability information of the second USIM also correspondingly changes.

Because the transmission capability information of the first USIM changes, a delay requirement of a service that is on the first USIM and whose priority is lower than that of the first service may not be met. Therefore, optionally, after step 302, the method further includes:

Step 303: The first access network device determines, based on the negotiated transmission capability information of the first USIM, a PDU session that needs to be released or deactivated and/or a QoS flow that needs to be deleted or deactivated.

Further, the first access network device may send indication information to a first session management network element corresponding to the first USIM. The indication information indicates that the first request cannot be met, and a cause value indicating that the first request cannot be met is multi-USIM communication. Alternatively, the indication information indicates the first access network device to reject the first request.

Because the transmission capability information of the second USIM changes, a delay requirement of a service that is on the second USIM and whose priority is lower than that of the first service may not be met. Therefore, optionally, after step 302, the method further includes:

Step 304: The terminal device determines updated transmission capability information of the second USIM based on the transmission capability information of the first USIM and the service of the terminal device, and sends the updated transmission capability information of the second USIM to a second access network device.

For example, the transmission capability information of the second USIM may be sent by using the RRC message.

Step 305: The second access network device receives the transmission capability information of the second USIM.

Step 306. Optionally, if the transmission capability information of the second USIM cannot meet a delay requirement of a PDU session of the second USIM, and/or cannot meet a delay requirement of a QoS flow of the second USIM, the second access network device determines the PDU session that needs to be released or deactivated and/or the QoS flow that needs to be deleted or deactivated.

Further, the second access network device sends notification information to a second session management network element corresponding to the second USIM. The notification information is used to notify that a requirement of the PDU session that needs to be released in the second USIM, and/or a requirement of the PDU session that needs to be deactivated, and/or a requirement of the QoS flow that needs to be deleted, and/or a requirement of the QoS flow that needs to be deactivated cannot be met, and a cause value indicating that the requirement cannot be met is multi-USIM communication. Alternatively, the second access network device sends a request message to a second session management network element corresponding to the second USIM. The request message is used to request to release the PDU session that needs to be released, and/or request to deactivate the PDU session that needs to be deactivated, and/or delete the QoS flow that needs to be deleted, and/or deactivate the QoS flow that needs to be deactivated.

For example, a method for determining, by the first access network device, a PDU session that needs to be released or deactivated and/or a QoS flow that needs to be deleted or deactivated may be as follows: If the delay requirement of the PDU session in the first USIM cannot be met by the transmission capability information of the first USIM, it is determined that the PDU session is a PDU session that needs to be released or deactivated. If the delay requirement of the QoS flow in the first USIM cannot be met by the transmission capability information of the first USIM, it is determined that the QoS flow is a QoS flow that needs to be deleted or deactivated.

For example, a method for determining, by the second access network device, a PDU session that needs to be released or deactivated and/or a QoS flow that needs to be deleted or deactivated may be as follows: If the delay requirement of the PDU session in the second USIM cannot be met by the transmission capability information of the second USIM, it is determined that the PDU session is a PDU session that needs to be released or deactivated. If the delay requirement of the QoS flow in the second USIM cannot be met by the transmission capability information of the second USIM, it is determined that the QoS flow is a QoS flow that needs to be deleted or deactivated.

It should be noted that step 303, step 304, and step 305 are not limited to an execution sequence.

The foregoing mainly describes the solutions provided in this application from a perspective of interaction between network elements. It may be understood that, to implement the foregoing functions, each network element includes a corresponding hardware structure and/or software module for implementing each function. A person skilled in the art should easily be aware that, in combination with the units and algorithm steps in the examples described in embodiments disclosed in this specification, the present invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

It may be understood that in the foregoing method embodiments, corresponding steps or operations implemented by the terminal device may alternatively be implemented by a component (for example, a chip or a circuit) configured in the terminal device, and corresponding steps or operations implemented by the access network device may alternatively be implemented by a component (for example, a chip or a circuit) configured in the access network device.

An embodiment of this application further provides an apparatus configured to implement any one of the foregoing methods. For example, this embodiment provides an apparatus including units (or means) configured to implement steps performed by the terminal device in any one of the foregoing methods. For another example, another apparatus is further provided, and includes units (or means) configured to implement the steps performed by the access network device in any one of the foregoing methods.

Figure 4:
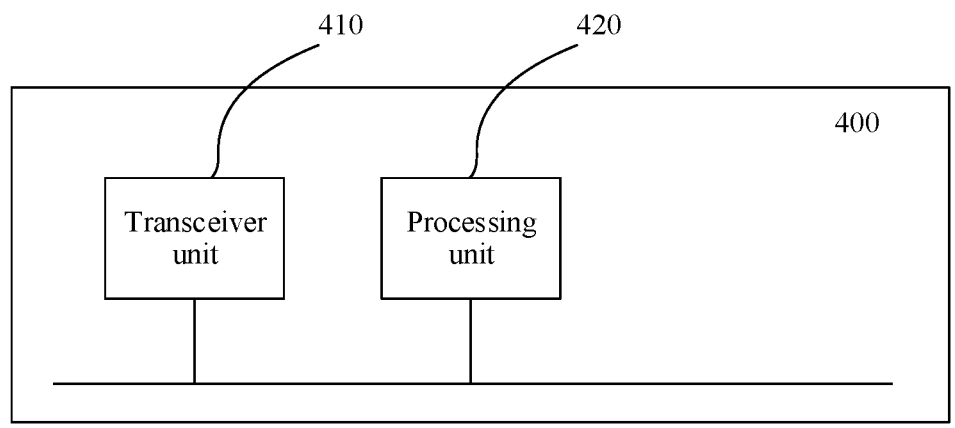
FIG. 4 is a schematic diagram of a communication apparatus according to an embodiment of this application.

For example, FIG. 4 is a schematic diagram of a communication apparatus according to an embodiment of this application. The apparatus is configured to implement the steps performed by the corresponding terminal device in the foregoing method embodiment. As shown in FIG. 4, the apparatus 400 includes a transceiver unit 410 and a processing unit 420.

In the first embodiment:

The processing unit 420 is configured to: when a first service needs to be newly established on a first USIM, obtain transmission capability information. The transmission capability information includes single communication duration of the first USIM and single communication duration of a second USIM. The terminal device includes the first USIM and the second USIM. The single communication duration of the second USIM is a single communication periodicity of the first USIM, and the single communication duration of the first USIM is a single communication periodicity of the second USIM. In addition, the processing unit 420 is configured to determine, based on the transmission capability information and a requirement of the first service, whether to establish a first service. The requirement of the first service indicates a delay requirement of the first service.

In a possible implementation method, that the processing unit 420 is configured to determine, based on the transmission capability information and a requirement of the first service, whether to establish a first service specifically includes: If the single communication duration of the second USIM in the transmission capability information is less than the delay requirement of the first service, the first service is established. Alternatively, if the single communication duration of the second USIM in the transmission capability information is greater than the delay requirement of the first service, the single communication duration of the second USIM is adjusted, to enable adjusted transmission capability information to meet the delay requirement of the first service and a delay requirement of a second service, where a priority of the second service is higher than a priority of the first service. Alternatively, if the single communication duration of the second USIM in the transmission capability information is greater than the delay requirement of the first service, not to establish the first service is determined. Alternatively, if the single communication duration of the second USIM in the transmission capability information is greater than the delay requirement of the first service, and when the first service is a service with a highest priority in the terminal, to establish the first service is determined.

In a possible implementation method, that the processing unit 420 is configured to adjust the single communication duration of the second USIM includes: The processing unit 420 is configured to reduce the single communication duration of the second USIM.

In a possible implementation method, the transceiver unit 410 is configured to: after the processing unit 420 adjusts the single communication duration of the second USIM, send adjusted single communication duration of the second USIM to the first access network device corresponding to the first USIM; and receive a response message from the first access network device. The response message indicates that use of the adjusted single communication duration of the second USIM is accepted.

In a possible implementation method, that the processing unit 420 is configured to: if the single communication duration of the second USIM in the transmission capability information is greater than the delay requirement of the first service, adjust the single communication duration of the second USIM, to enable adjusted transmission capability information to meet the delay requirement of the first service and a delay requirement of the second service specifically includes: The processing unit 420 is configured to: if the single communication duration of the second USIM in the transmission capability information is greater than the delay requirement of the first service, adjust the single communication duration of the first USIM and the single communication duration of the second USIM, to enable the adjusted transmission capability information to meet the delay requirement of the first service and the delay requirement of the second service.

In a possible implementation method, the processing unit 420 is further configured to: if to establish the first service is determined, determine a third service that needs to be stopped, where a priority of the third service is lower than the priority of the first service; and determine, based on the third service, a protocol data unit PDU session that needs to be released or deactivated and/or a quality of service QoS flow that needs to be deleted or deactivated.

In the second embodiment:

A transceiver unit 410 is configured to: receive first transmission capability information of a first universal subscriber identity module USIM from a first access network device corresponding to the first USIM, where the first transmission capability information includes single communication duration and a single communication periodicity of the first USIM, the terminal device includes the first USIM and a second USIM, and the single communication periodicity of the first USIM is single communication duration of the second USIM; and send a first response message to the first access network device based on a transmission capability requirement of the first USIM and a service of the terminal device. The first response message indicates that use of the first transmission capability information is accepted, or the first response message indicates that use of the first transmission capability information is rejected, or the response message includes second transmission capability information of the first USIM.

In a possible implementation method, the processing unit 420 is configured to: before the transceiver unit 410 receives the first transmission capability information of the first USIM from the first access network device corresponding to the first USIM, initiate protocol data unit PDU session establishment or quality of service QoS flow establishment for the first service of the first USIM; or initiate PDU session activation or QoS flow activation for the first service of the first USIM.

In a possible implementation method, when the first transmission capability information of the first USIM is used, if the first service and a second service of the terminal device can be simultaneously performed, and a priority of the second service is higher than a priority of the first service, the response message indicates that use of the first transmission capability information is accepted. Alternatively, when the first transmission capability information of the first USIM is used, if the first service and a second service of the terminal device cannot be simultaneously performed, and a priority of the first service is higher than a priority of the second service, the response message indicates that use of the first transmission capability information is accepted. Alternatively, when the first transmission capability information of the first USIM is used, if the first service and the second service of the terminal device cannot be simultaneously performed, and a priority of the first service is lower than a priority of the second service, the response message indicates that use of the first transmission capability information is rejected, or the response message includes the second transmission capability information of the first USIM.

In a possible implementation method, the transceiver unit 410 is further configured to send, based on the transmission capability information of the first USIM and a service of the terminal device, transmission capability information of the second USIM to a second access network device corresponding to the second USIM. The transmission capability information of the second USIM includes a single communication periodicity of the second USIM and the single communication duration of the second USIM, where the single communication periodicity of the second USIM is the single communication duration of the first USIM, and the single communication duration of the second USIM is the single communication periodicity of the first USIM.

In a possible implementation method, the first response message includes the second transmission capability information of the first USIM. The transceiver unit 410 is further configured to receive a second response message from the first access network device. If the second response message indicates that use of the second transmission capability information is accepted, the processing unit 420 is configured to determine that the first USIM uses the second transmission capability information to perform communication. Alternatively, if the second response message indicates that use of the second transmission capability information is rejected, the processing unit 420 is configured to determine that the first USIM uses the first transmission capability information to perform communication.

It may be understood that the foregoing units may also be referred to as modules, circuits, or the like, and the foregoing units may be independently disposed, or may be completely or partially integrated.

Optionally, the communication apparatus 400 may further include a storage unit. The storage unit is configured to store data or instructions (which may also be referred to as code or a program). The foregoing units may interact with or be coupled to the storage unit, to implement a corresponding method or function. For example, the processing unit may read the data or the instructions in the storage unit, so that the communication apparatus implements the methods in the foregoing embodiments.

Figure 5:
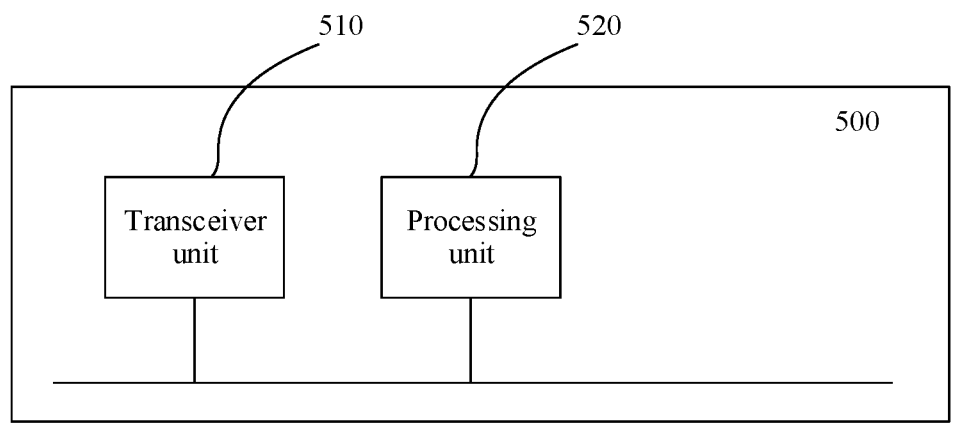
FIG. 5 is a schematic diagram of another communication apparatus according to an embodiment of this application.

For example, FIG. 5 is a schematic diagram of a communication apparatus according to an embodiment of this application. The apparatus is configured to implement the steps corresponding to the first access network device or the second access network device in the foregoing method embodiments. As shown in FIG. 5, the apparatus 500 includes a transceiver unit 510 and a processing unit 520.

In the first embodiment:

The transceiver unit 510 is configured to send first transmission capability information of the first USIM to a terminal device, where the first transmission capability information includes single communication duration and a single communication periodicity of the first USIM, the terminal device includes the first USIM and a second USIM, and the single communication periodicity of the first USIM is single communication duration of the second USIM; and receive a first response message from the terminal device, where the first response message indicates that use of the first transmission capability information is accepted, or the first response message indicates that use of the first transmission capability information is rejected, or the first response message includes second transmission capability information of the first USIM.

In a possible implementation method, the transceiver unit 510 is further configured to: receive a first request before sending the first transmission capability information of the first USIM to the terminal device, where the first request is used to initiate establishment of a protocol data unit PDU session or establishment of a quality of service QoS flow for a first service; or the first request is used to initiate PDU session activation or QoS flow activation for a first service.

In a possible implementation method, when the first transmission capability information of the first USIM is used, if the first service and a second service of the terminal device can be simultaneously performed, and a priority of the second service is higher than a priority of the first service, the first response message indicates that use of the first transmission capability information is accepted. Alternatively, when the first transmission capability information of the first USIM is used, if the first service and a second service of the terminal device cannot be simultaneously performed, and a priority of the first service is higher than a priority of the second service, the first response message indicates that use of the first transmission capability information is accepted. Alternatively, when the first transmission capability information of the first USIM is used, if the first service and the second service of the terminal device cannot be simultaneously performed, and a priority of the first service is lower than a priority of the second service, the first response message indicates that use of the first transmission capability information is rejected, or the first response message includes the second transmission capability information of the first USIM.

In a possible implementation method, the processing unit 520 is configured to determine, based on the transmission capability information of the first USIM, a protocol data unit PDU session that needs to be released or deactivated and/or a quality of service QoS flow that needs to be deleted or deactivated.

In a possible implementation method, the transceiver unit 510 is further configured to send indication information to a first session management network element corresponding to the first USIM, where the indication information indicates that the first request cannot be met, and a cause value indicating that the first request cannot be met is multi-USIM communication. Alternatively, the indication information indicates the first access network device to reject the first request.

In a possible implementation method, the first response message includes the second transmission capability information of the first USIM. The transceiver unit 510 is further configured to send a second response message to the terminal device, where the second response message indicates that use of the second transmission capability information is accepted. Alternatively, the second response message indicates that use of the second transmission capability information is rejected.

In a possible implementation method, the first response message indicates that use of the first transmission capability information is rejected. Alternatively, the transceiver unit 510 is further configured to send a second response message to the terminal device, where the second response message indicates that use of the second transmission capability information is rejected. The processing unit 520 is further configured to reject establishment of a PDU session or a QoS flow for the first service, and/or reject activation of a PDU session or a QoS flow for the first service.

In the second embodiment:

The transceiver unit 510 is configured to receive transmission capability information of the second USIM from a terminal device, where the terminal device includes a first USIM and the second USIM, and the transmission capability information of the second USIM includes a single communication periodicity of the second USIM and single communication duration of the second USIM. The single communication periodicity of the second USIM is single communication duration of the first USIM, and the single communication duration of the second USIM is a single communication periodicity of the first USIM. The processing unit 520 is configured to determine, based on the transmission capability information of the second USIM, a protocol data unit PDU session that needs to be released or deactivated and/or a quality of service QoS flow that needs to be deleted or deactivated.

In a possible implementation method, that the processing unit 520 is configured to determine, based on the transmission capability information of the second USIM, a protocol data unit PDU session that needs to be released or deactivated and/or a quality of service QoS flow that needs to be deleted or deactivated specifically includes: If a delay requirement of a PDU session in the second USIM cannot be met by transmission capability information of the second USIM, that the PDU session is a PDU session that needs to be released or deactivated is determined; and/or if a delay requirement of a QoS flow in the second USIM cannot be met by the transmission capability information of the second USIM, that the QoS flow is a QoS flow that needs to be deleted or deactivated is determined.

In a possible implementation method, the transceiver unit 510 is further configured to: send notification information to a second session management network element corresponding to the second USIM. The notification information is used to notify that a requirement of the PDU session that needs to be released in the second USIM, and/or a requirement of the PDU session that needs to be deactivated, and/or a requirement of the QoS flow that needs to be deleted, and/or a requirement of the QoS flow that needs to be deactivated cannot be met, and a cause value indicating that the requirement cannot be met is multi-USIM communication; or send a request message to a second session management network element corresponding to the second USIM. The request message is used to request to release the PDU session that needs to be released, and/or request to deactivate the PDU session that needs to be deactivated, and/or delete the QoS flow that needs to be deleted, and/or deactivate the QoS flow that needs to be deactivated.

It may be understood that the foregoing units may also be referred to as modules, circuits, or the like, and the foregoing units may be independently disposed, or may be completely or partially integrated.

Optionally, the communication apparatus 500 may further include a storage unit. The storage unit is configured to store data or instructions (which may also be referred to as code or a program). The foregoing units may interact with or be coupled to the storage unit, to implement a corresponding method or function. For example, the processing unit may read the data or the instructions in the storage unit, so that the communication apparatus implements the methods in the foregoing embodiments.

It should be understood that division of the foregoing apparatus into units is merely division into logical functions. During actual implementation, all or some of the units may be integrated into one physical entity, or may be physically separated. In addition, all the units in the apparatus may be implemented in a form in which a processing element invokes software, or may be implemented in a form of hardware; or some units may be implemented in a form of software invoked by a processing element, and some units may be implemented in a form of hardware. For example, the units may be separately disposed processing elements, or may be integrated into a chip of the apparatus for implementation. In addition, the units may be stored in a memory in a program form, and is invoked by a processing element of the apparatus to perform functions of the units. In addition, all or some of the units may be integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in the processor element, or may be implemented in the form in which a processing element invokes software.

For example, a unit in any one of the foregoing apparatuses may be one or more integrated circuits configured to implement the foregoing method, for example, one or more application-specific integrated circuits (Application Specific Integrated Circuits, ASICs), one or more microprocessors (digital signal processors, DSPs), one or more field programmable gate arrays (Field Programmable Gate Arrays, FPGAs), or a combination of at least two of the integrated circuits. For another example, when the units in the apparatus may be implemented in a form in which a processing element invokes a program, the processing element may be a general-purpose processor, for example, a central processing unit (Central Processing Unit, CPU) or another processor that can invoke the program. For another example, the units may be integrated together and implemented in a form of a system-on-a-chip (system-on-a-chip, SOC).

The foregoing unit for receiving (for example, the receiving unit) is an interface circuit of the apparatus, and is configured to receive a signal from another apparatus. For example, when the apparatus is implemented by a chip, the receiving unit is an interface circuit that is of the chip and that is configured to receive a signal from another chip or apparatus. The foregoing unit for sending (for example, the sending unit) is an interface circuit of the apparatus, and is configured to send a signal to another apparatus. For example, when the apparatus is implemented by a chip, the sending unit is an interface circuit that is of the chip and that is configured to send a signal to another chip or apparatus.

Figure 6:
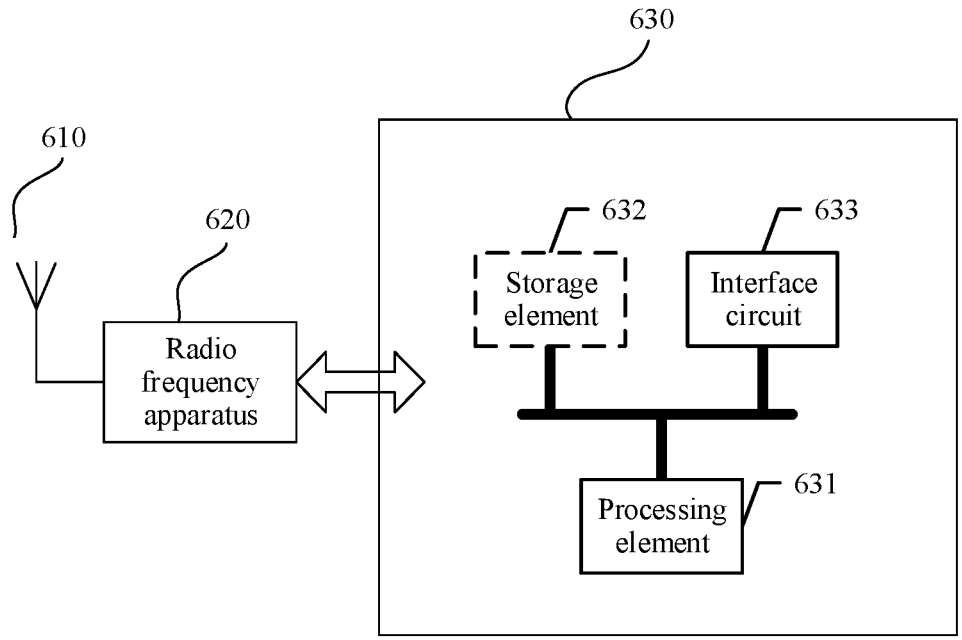
FIG. 6 is a schematic diagram of a terminal device according to an embodiment of this application.

FIG. 6 is a schematic diagram of a structure of a terminal device according to an embodiment of this application. The terminal device is configured to implement operations of the terminal device in the foregoing embodiments. As shown in FIG. 6, the terminal device includes an antenna 610, a radio frequency apparatus 620, and a signal processing part 630. The antenna 610 is connected to the radio frequency apparatus 620. In a downlink direction, the radio frequency apparatus 620 receives information sent by the access network device by using the antenna 610, and sends the information sent by the access network device to the signal processing part 630 for processing. In an uplink direction, the signal processing part 630 processes the information about the terminal device, and sends the processed information to the radio frequency apparatus 620. The radio frequency apparatus 620 processes the information about the terminal device, and then sends the processed information to the access network device by using the antenna 610.

The signal processing part 630 is configured to process each communication protocol layer of data. The signal processing part 630 may be a subsystem of the terminal device. The terminal device may further include another subsystem, for example, a central processing subsystem, configured to implement processing on an operating system and an application layer of the terminal device. For another example, a peripheral subsystem is configured to implement a connection to another device. The signal processing part 630 may be a separately disposed chip. Optionally, the foregoing apparatus may be located in the signal processing part 630.

The signal processing part 630 may include one or more processing elements 631, for example, include a main control CPU and other integrated circuits, and include an interface circuit 633. In addition, the signal processing part 630 may further include a storage element 632. The storage element 632 is configured to store data and a program. The program used to perform the method performed by the terminal device in the foregoing method may be stored in the storage element 632, or may not be stored in the storage element 632, for example, stored in a memory outside the signal processing part 630, when used, the signal processing part 630 loads the program into the cache for use. The interface circuit 633 is configured to communicate with the apparatus. The foregoing apparatus may be located in the signal processing part 630. The signal processing part 630 may be implemented by using a chip. The chip includes at least one processing element and an interface circuit. The processing element is configured to perform steps of any method performed by the foregoing terminal device. The interface circuit is configured to communicate with another apparatus. In an implementation, units that implement the steps in the foregoing methods may be implemented in a form of a program invoked by a processing element. For example, the apparatus includes a processing element and a storage element. The processing element invokes a program stored in the storage element, to perform the methods performed by the terminal device in the foregoing method embodiments. The storage element may be a storage element located on a same chip as the processing element, that is, an on-chip storage element.

In another implementation, a program used to perform the method performed by the terminal device in the foregoing methods may be in a storage element that is on a different chip from the processing unit, namely, an off-chip storage element. In this case, the processing element invokes or loads the program from the off-chip storage element to the on-chip storage element, to invoke and perform the methods performed by the terminal device in the foregoing method embodiments.

In still another implementation, units of the terminal device that implement the steps in the foregoing methods may be configured as one or more processing elements. These processing elements are disposed in the signal processing part 630. The processing elements herein may be an integrated circuit, for example, one or more ASICs, one or more DSPs, one or more FPGAs, or a combination of these types of integrated circuits. These integrated circuits may be integrated to form a chip.

The units that implement the steps in the foregoing method may be integrated together and implemented in a form of a system-on-a-chip (system-on-a-chip, SOC). The SOC chip is configured to implement the foregoing method. At least one processing element and storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by invoking a program by the processing element, and functions of some units may be implemented by the integrated circuit.

It can be learned that the foregoing apparatus may include at least one processing element and interface circuit. The at least one processing element is configured to perform any one of the methods that are provided in the foregoing method embodiments and performed by the terminal device. The processing element may perform some or all steps performed by the terminal device, in a first manner, to be specific, by invoking the program stored in the storage element; or may perform some or all steps performed by the terminal device, in a second manner, to be specific, by using a hardware integrated logic circuit in the processor element in combination with instructions; or may certainly perform, by combining the first manner and the second manner, some or all steps performed by the terminal device.

Likewise, the processing element herein may be a general-purpose processor, for example, a CPU, or may be one or more integrated circuits, for example, one or more ASICs, one or more microprocessors DSPs, one or more FPGAs, or a combination of at least two of these types of integrated circuits, configured to implement the foregoing methods. The storage element may be a memory, or may be a general term of a plurality of storage elements.

Figure 7:
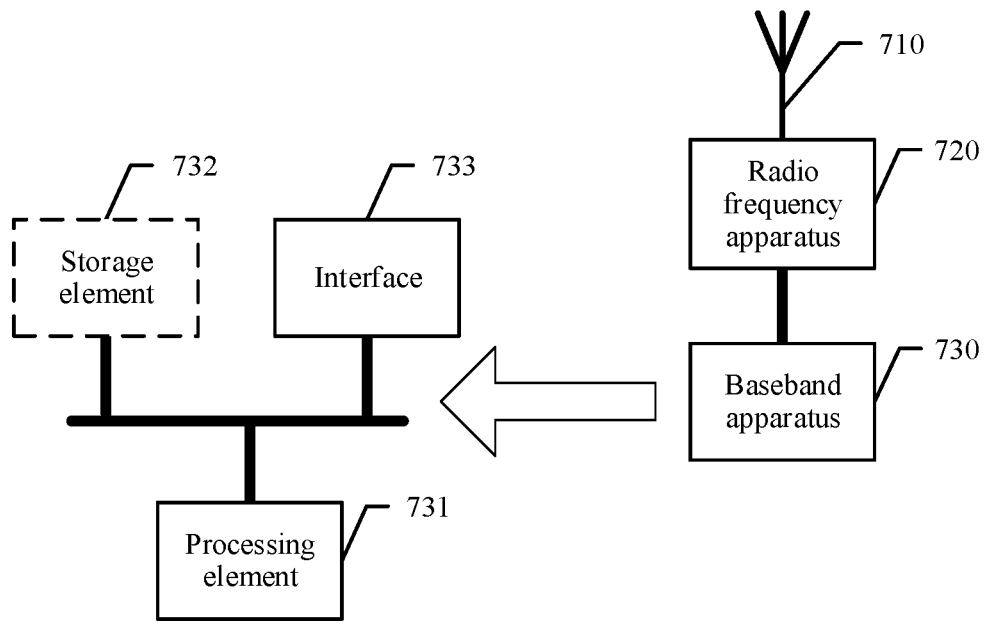
FIG. 7 is a schematic diagram of an access network device according to an embodiment of this application.

FIG. 7 is a schematic diagram of a structure of an access network device according to an embodiment of this application. The access network device is configured to implement an operation of the first access network device or the second access network device in the foregoing embodiments. As shown in FIG. 7, the access network device includes an antenna 710, a radio frequency apparatus 720, and a baseband apparatus 730. The antenna 710 is connected to the radio frequency apparatus 720. In an uplink direction, the radio frequency apparatus 720 receives information sent by the terminal device by using the antenna 710, and sends the information sent by the terminal device to the baseband apparatus 730 for processing. In a downlink direction, the baseband apparatus 730 processes information about the terminal device, and sends the information to the radio frequency apparatus 720. The radio frequency apparatus 720 processes the information about the terminal device, and then sends the processed information to the terminal device by using the antenna 710.

The baseband apparatus 730 may include one or more processing elements 731, for example, include a main control CPU and another integrated circuit, and further include an interface 733. In addition, the baseband apparatus 730 may further include a storage element 732. The storage element 732 is configured to store a program and data. The interface 733 is configured to exchange information with the radio frequency apparatus 720. The interface is, for example, a common public radio interface (common public radio interface, CPRI). The foregoing apparatus used in the access network device may be located in the baseband apparatus 730. For example, the foregoing apparatus used in the access network device may be a chip in the baseband apparatus 730. The chip includes at least one processing element and an interface circuit. The processing element is configured to perform the steps of any method performed by the access network device. The interface circuit is configured to communicate with another apparatus. In an implementation, units of the access network device that implement the steps in the foregoing methods may be implemented in a form of a program invoked by a processing element. For example, the apparatus used in the access network device includes a processing element and a storage element. The processing element invokes a program stored in the storage element, to perform the methods performed by the access network device in the foregoing method embodiments. The storage element may be a storage element that is located on a same chip as the processing element, namely, an on-chip storage element, or may be a storage element that is located on a different chip from the processing element, namely, an off-chip storage element.

In another implementation, units of the access network device that implement the steps in the foregoing method may be configured as one or more processing elements. These processing elements are disposed in the baseband apparatus. The processing element herein may be an integrated circuit, for example, one or more ASICs, one or more DSPs, one or more FPGAs, or a combination of these types of integrated circuits. These integrated circuits may be integrated to form a chip.

Units of the access network device that implement the steps in the foregoing method may be integrated together, and implemented in a form of a system-on-a-chip (system-on-a-chip, SOC). For example, the baseband apparatus includes the SOC chip, configured to implement the foregoing method. At least one processing element and storage element may be integrated into the chip, and the processing element invokes a program stored in the storage element to implement the foregoing methods performed by the access network device. Alternatively, at least one integrated circuit may be integrated into the chip, to implement the foregoing methods performed by the access network device. Alternatively, with reference to the foregoing implementations, functions of some units may be implemented by invoking a program by the processing element, and functions of some units may be implemented by the integrated circuit.

It can be learned that the foregoing apparatus used for the access network device may include at least one processing element and interface circuit. The at least one processing element is configured to perform any one of the methods that are provided in the foregoing method embodiments and performed by the access network device. The processing element may perform some or all steps performed by the access network device, in a first manner, to be specific, by invoking the program stored in the storage element; or may perform some or all steps performed by the access network device, in a second manner, to be specific, by using a hardware integrated logic circuit in the processor element in combination with instructions; or may certainly perform, by combining the first manner and the second manner, some or all steps performed by the access network device.

Likewise, the processing element herein may be a general-purpose processor, for example, a CPU, or may be one or more integrated circuits, for example, one or more ASICs, one or more microprocessors DSPs, one or more FPGAs, or a combination of at least two of these types of integrated circuits, configured to implement the foregoing methods. The storage element may be a memory, or may be a general term of a plurality of storage elements.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on the computer, the procedure or functions according to embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (solid state disk, SSD)), or the like.

The various illustrative logical units and circuits described in embodiments of this application may implement or operate the described functions through a general-purpose processor, a digital signal processor, an application-specific integrated circuit (ASIC), a field programmable gate array (FPGA), another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

In one or more example designs, the functions described in this application may be implemented by using hardware, software, firmware, or any combination thereof. If the functions are implemented by using the software, these functions may be stored in a computer-readable medium or are transmitted to the computer-readable medium in a form of one or more instructions or code. The computer-readable medium includes a computer storage medium and a communication medium that enables a computer program to move from one place to another. The storage medium may be an available medium that may be accessed by any general-purpose or special computer. For example, such a computer-readable medium may include but is not limited to a RAM, a ROM, an EEPROM, a CD-ROM or another optical disc storage, a disk storage or another magnetic storage apparatus, or any other medium that may be used to bear or store program code, where the program code is in a form of an instruction structure or a data structure or in a form that can be read by a general-purpose or special computer or a general-purpose or special processor. In addition, any connection may be appropriately defined as the computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in the defined computer-readable medium. The disk (disk) and the disc (disc) include a compact disc, a laser disc, an optical disc, a digital versatile disc (English: Digital Versatile Disc, DVD for short), a floppy disk, and a Blu-ray disc. The disc usually copies data by a magnetic means, and the disk optically copies data by a laser means. The foregoing combination may alternatively be included in the computer-readable medium.

A person skilled in the art should be aware that in the foregoing one or more examples, functions described in this application may be implemented by using hardware, software, firmware, or any combination thereof. When the functions are implemented by using the software, the foregoing functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or a special-purpose computer.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of and all modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A communication method, comprising:
receiving, by a terminal device, first transmission capability information of a first universal subscriber identity module (USIM) from a first access network device corresponding to the first USIM, wherein the first transmission capability information of the first USIM comprises single communication duration of the first USIM and a single communication periodicity of the first USIM, and the terminal device comprises the first USIM and a second USIM, wherein the single communication periodicity of the first USIM is single communication duration of the second USIM; and
sending, by the terminal device, a first response message to the first access network device based on a transmission capability requirement of the first USIM and a service of the terminal device, wherein the first response message indicates that use of the first transmission capability information of the first USIM is accepted, the first response message indicates that use of the first transmission capability information of the first USIM is rejected, or the first response message comprises second transmission capability information of the first USIM.

2. The method according to claim 1, wherein before the receiving, by a terminal device, first transmission capability information of a first USIM from a first access network device corresponding to the first USIM, the method further comprises:
initiating, by the terminal device, protocol data unit (PDU) session establishment or quality of service (QOS) flow establishment for a first service of the first USIM; or
initiating, by the terminal device, PDU session activation or QoS flow activation for the first service of the first USIM.

3. The method according to claim 2, wherein:
when the first transmission capability information of the first USIM is used, if the first service and a second service of the terminal device can be simultaneously performed, and a priority of the second service is higher than a priority of the first service, the first response message indicates that use of the first transmission capability information of the first USIM is accepted; or
when the first transmission capability information of the first USIM is used, if the first service and the second service of the terminal device cannot be simultaneously performed, and a priority of the first service is higher than a priority of the second service, the first response message indicates that use of the first transmission capability information of the first USIM is accepted; or
when the first transmission capability information of the first USIM is used, if the first service and the second service of the terminal device cannot be simultaneously performed, and a priority of the first service is lower than a priority of the second service, the first response message indicates that use of the first transmission capability information of the first USIM is rejected, or the first response message comprises the second transmission capability information of the first USIM.

4. The method according to claim 1, further comprising:
sending, by the terminal device based on transmission capability information of the first USIM and a service of the terminal device, transmission capability information of the second USIM to a second access network device corresponding to the second USIM, wherein the transmission capability information of the second USIM comprises a single communication periodicity of the second USIM and the single communication duration of the second USIM, wherein the single communication periodicity of the second USIM is the single communication duration of the first USIM, and the single communication duration of the second USIM is the single communication periodicity of the first USIM.

5. The method according to claim 1, wherein the first response message comprises the second transmission capability information of the first USIM; and
the method further comprises:
receiving, by the terminal device, a second response message from the first access network device; and
if the second response message indicates that use of the second transmission capability information of the first USIM is accepted, determining, by the terminal device, that the first USIM uses the second transmission capability information of the first USIM to perform communication; or
if the second response message indicates that use of the second transmission capability information of the first USIM is rejected, determining, by the terminal device, that the first USIM uses the first transmission capability information of the first USIM to perform communication.

6. A communication method, comprising:
sending, by a first access network device corresponding to a first universal subscriber identity module (USIM), first transmission capability information of the first USIM to a terminal device, wherein the first transmission capability information of the first USIM comprises single communication duration of the first USIM and a single communication periodicity of the first USIM, and the terminal device comprises the first USIM and a second USIM, wherein the single communication periodicity of the first USIM is single communication duration of the second USIM; and
receiving, by the first access network device, a first response message from the terminal device, wherein the first response message indicates that use of the first transmission capability information of the first USIM is accepted, or the first response message indicates that use of the first transmission capability information of the first USIM is rejected, or the first response message comprises second transmission capability information of the first USIM.

7. The method according to claim 6, wherein before the sending, by a first access network device corresponding to a first USIM, first transmission capability information of the first USIM to a terminal device, the method further comprises:
- receiving, by the first access network device, a first request, wherein the first request is used to initiate establishment of a protocol data unit (PDU) session or establishment of a quality of service (QOS) flow for a first service; or
- the first request is used to initiate PDU session activation or QoS flow activation for the first service.

8. The method according to claim 7, wherein:
- when the first transmission capability information of the first USIM is used, if the first service and a second service of the terminal device can be simultaneously performed, and a priority of the second service is higher than a priority of the first service, the first response message indicates that use of the first transmission capability information of the first USIM is accepted; or
- when the first transmission capability information of the first USIM is used, if the first service and the second service of the terminal device cannot be simultaneously performed, and a priority of the first service is higher than a priority of the second service, the first response message indicates that use of the first transmission capability information of the first USIM is accepted; or
- when the first transmission capability information of the first USIM is used, if the first service and the second service of the terminal device cannot be simultaneously performed, and a priority of the first service is lower than a priority of the second service, the first response message indicates that use of the first transmission capability information of the first USIM is rejected, or the first response message comprises the second transmission capability information of the first USIM.

9. The method according to claim 6, further comprising:
- determining, by the first access network device based on transmission capability information of the first USIM, at least one of a protocol data unit PDU session that needs to be released or deactivated or a quality of service QoS flow that needs to be deleted or deactivated.

10. The method according to claim 9, further comprising:
- sending, by the first access network device, indication information to a first session management network element corresponding to the first USIM, wherein:
  - the indication information indicates that a first request cannot be met, and a cause value indicating that the first request cannot be met is multi-USIM communication; or
  - the indication information indicates the first access network device to reject the first request.

11. A terminal device, comprising:
- a transceiver;
- at least one processor; and
- one or more memories coupled to the at least one processor and storing programming instructions for execution by the at least one processor to cause the terminal device to:
- receive first transmission capability information of a first universal subscriber identity module (USIM) from a first access network device corresponding to the first USIM, wherein the first transmission capability information of the first USIM comprises single communication duration of the first USIM and a single communication periodicity of the first USIM, and the terminal device comprises the first USIM and a second USIM, wherein the single communication periodicity of the first USIM is single communication duration of the second USIM; and
- send a first response message to the first access network device based on a transmission capability requirement of the first USIM and a service of the terminal device, wherein the first response message indicates that use of the first transmission capability information of the first USIM is accepted, the first response message indicates that use of the first transmission capability information of the first USIM is rejected, or the first response message comprises second transmission capability information of the first USIM.

12. The terminal device according to claim 11, wherein the programming instructions, when executed by the at least one processor, cause the terminal device to:
- initiate protocol data unit (PDU) session establishment or quality of service (QOS) flow establishment for a first service of the first USIM; or
- initiate PDU session activation or QoS flow activation for the first service of the first USIM.

13. The terminal device according to claim 12, wherein:
- when the first transmission capability information of the first USIM is used, if the first service and a second service of the terminal device can be simultaneously performed, and a priority of the second service is higher than a priority of the first service, the first response message indicates that use of the first transmission capability information of the first USIM is accepted; or
- when the first transmission capability information of the first USIM is used, if the first service and the second service of the terminal device cannot be simultaneously performed, and a priority of the first service is higher than a priority of the second service, the first response message indicates that use of the first transmission capability information of the first USIM is accepted; or
- when the first transmission capability information of the first USIM is used, if the first service and the second service of the terminal device cannot be simultaneously performed, and a priority of the first service is lower than a priority of the second service, the first response message indicates that use of the first transmission capability information of the first USIM is rejected, or the first response message comprises the second transmission capability information of the first USIM.

14. The terminal device according to claim 11, wherein the programming instructions, when executed by the at least one processor, cause the terminal device to:
- send, based on transmission capability information of the first USIM and a service of the terminal device, transmission capability information of the second USIM to a second access network device corresponding to the second USIM, wherein the transmission capability information of the second USIM comprises a single communication periodicity of the second USIM and the single communication duration of the second USIM, wherein the single communication periodicity of the second USIM is the single communication duration of the first USIM, and the single communication duration of the second USIM is the single communication periodicity of the first USIM.

15. The terminal device according to claim 11, wherein the first response message comprises the second transmission capability information of the first USIM; and the programming instructions, when executed by the at least one processor, cause the terminal device to:

receive a second response message from the first access network device; and if the second response message indicates that use of the second transmission capability information of the first USIM is accepted, determine that the first USIM uses the second transmission capability information of the first USIM to perform communication; or if the second response message indicates that use of the second transmission capability information of the first USIM is rejected, determine that the first USIM uses the first transmission capability information of the first USIM to perform communication.

16. An access network device, comprising: a transceiver; at least one processor; and one or more memories coupled to the at least one processor and storing programming instructions for execution by the at least one processor to cause the access network device to:

send, corresponding to a first universal subscriber identity module (USIM), first transmission capability information of the first USIM to a terminal device, wherein the first transmission capability information of the first USIM comprises single communication duration of the first USIM and a single communication periodicity of the first USIM, and the terminal device comprises the first USIM and a second USIM, wherein the single communication periodicity of the first USIM is single communication duration of the second USIM; and receive a first response message from the terminal device, wherein the first response message indicates that use of the first transmission capability information of the first USIM is accepted, the first response message indicates that use of the first transmission capability information of the first USIM is rejected, or the first response message comprises second transmission capability information of the first USIM.

17. The access network device according to claim 16, wherein the programming instructions, when executed by the at least one processor, cause the access network device to:

receive a first request, wherein the first request is used to initiate establishment of a protocol data unit (PDU) session or establishment of a quality of service (QOS) flow for a first service; or the first request is used to initiate PDU session activation or QoS flow activation for the first service.

18. The access network device according to claim 17, wherein:

when the first transmission capability information of the first USIM is used, if the first service and a second service of the terminal device can be simultaneously performed, and a priority of the second service is higher than a priority of the first service, the first response message indicates that use of the first transmission capability information of the first USIM is accepted; or when the first transmission capability information of the first USIM is used, if the first service and the a second service of the terminal device cannot be simultaneously performed, and a priority of the first service is higher than a priority of the second service, the first response message indicates that use of the first transmission capability information of the first USIM is accepted; or when the first transmission capability information of the first USIM is used, if the first service and the second service of the terminal device cannot be simultaneously performed, and a priority of the first service is lower than a priority of the second service, the first response message indicates that use of the first transmission capability information of the first USIM is rejected, or the first response message comprises the second transmission capability information of the first USIM.

19. The access network device according to claim 16, wherein the programming instructions, when executed by the at least one processor, cause the access network device to:

determine, based on transmission capability information of the first USIM, at least one of a PDU session that needs to be released or deactivated or a QoS flow that needs to be deleted or deactivated.

20. The access network device according to claim 19, wherein the programming instructions, when executed by the at least one processor, cause the access network device to:

send indication information to a first session management network element corresponding to the first USIM, wherein;

the indication information indicates that a first request cannot be met, and a cause value indicating that the first request cannot be met is multi-USIM communication; or the indication information indicates the access network device to reject the first request.

* * * * *

UNITED STATES PATENT AND TRADEMARK OFFICE
CERTIFICATE OF CORRECTION

PATENT NO. : 12,185,422 B2
APPLICATION NO. : 17/871583
DATED : December 31, 2024
INVENTOR(S) : Jiangwei Ying Page 1 of 1

It is certified that error appears in the above-identified patent and that said Letters Patent is hereby corrected as shown below:

In the Specification

In Column 1, In Line 10, Delete "entirety" and insert -- entirety. --.

In the Claims

In Column 29, In Line 51, In Claim 2, delete "(QOS)" and insert -- (QoS) --.

In Column 31, In Line 7, In Claim 7, delete "(QOS)" and insert -- (QoS) --.

In Column 31, In Line 39, In Claim 9, delete "protocol data unit PDU" and insert -- PDU --.

In Column 31, In Line 40-41, In Claim 9, delete "quality of service QoS" and insert -- QoS --.

In Column 32, In Line 19, In Claim 12, delete "(QOS)" and insert -- (QoS) --.

In Column 33, In Line 44, In Claim 17, delete "(QOS)" and insert -- (QoS) --.

In Column 34, In Line 10 (Approx.), In Claim 18, delete "the a" and insert -- the --.

In Column 34, In Line 40 (Approx.), In Claim 20, delete "wherein;" and insert -- wherein: --.

Signed and Sealed this
Twenty-fifth Day of March, 2025

Coke Morgan Stewart
*Acting Director of the United States Patent and Trademark Office*